US006847327B2

(12) United States Patent
Ylitalo

(10) Patent No.: US 6,847,327 B2
(45) Date of Patent: Jan. 25, 2005

(54) BASE STATION, BASE STATION MODULE AND METHOD FOR DIRECTION OF ARRIVAL ESTIMATION

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/204,515

(22) PCT Filed: Dec. 23, 2000

(86) PCT No.: PCT/EP00/13256

§ 371 (c)(1), (2), (4) Date: Sep. 18, 2002

(87) PCT Pub. No.: WO02/052677

PCT Pub. Date: Jul. 4, 2002

(65) Prior Publication Data

US 2003/0151553 A1 Aug. 14, 2003

(51) Int. Cl.[7] ................................................ G01S 1/08
(52) U.S. Cl. ....................................... 342/407; 342/427
(58) Field of Search ................................ 342/158, 374, 342/377, 407, 409, 423, 429, 432, 433, 437, 438, 443, 427

(56) References Cited

U.S. PATENT DOCUMENTS 4,050,074 A * 9/1977 Toman ....................... 342/408
5,075,696 A * 12/1991 Wilby et al. ................. 342/432
5,410,320 A 4/1995 Rudish et al. .............. 342/373
6,218,987 B1 * 4/2001 Derneryd et al. ........... 342/373
6,222,486 B1 * 4/2001 Flacke et al. ............... 342/432

FOREIGN PATENT DOCUMENTS

EP 0 865 099 A2 9/1998 ............ H01Q/3/26
GB 2 281 010 A 2/1995 ............ H04Q/7/38

* cited by examiner

*Primary Examiner*—Gregory C. Issing
(74) *Attorney, Agent, or Firm*—Cohen, Pontani, Lieberman & Pavane

(57) ABSTRACT

The invention relates to a base station for a radio communications network. In order to be able to enhance the resolution for a direction of arrival estimation, the base station comprises: a first phasing network (31) for forming beams ($B_1$–$B_4$) for fixed reception angles; a second phasing network (33) for co-phasing and summing the signals of at least two neighbouring beams ($B_2$, $B_3$), thus forming a beam ($B_{2\text{-}3}$) for a reception angle in-between at least those two neighbouring beams ($B_2$, $B_3$), and for scaling each resulting beam ($B_{2\text{-}3}$) with a predetermined factor; and means for estimating the direction of arrival in the uplink from the beams ($B_1$–$B_4$, $B_{2\text{-}3}$) provided by the first and the second phasing network (31, 33). The invention equally relates to a corresponding method and to a base station module comprising such a first and second phasing network.

37 Claims, 7 Drawing Sheets

Amplitude beam pattems from 8-beam DBM

Amplitude beam pattems of 8-beam DBM
with DOA finetuning

BASE STATION, BASE STATION MODULE AND METHOD FOR DIRECTION OF ARRIVAL ESTIMATION

CROSS REFERENCE TO RELATED APPLICATION

This is a U.S. national stage application under 35 U.S.C. 0371 of international stage application No. PCT/EP00/13256, filed on Dec. 23, 2000, which date is the filing date of this application under 35 U.S.C. §363.

FIELD OF THE INVENTION

The invention relates to a base station for a radio communications network, a module for such a base station and a method for enhancing the angular resolution in the estimation of the direction of arrival of signals in the uplink in a base station of a radio communications network.

BACKGROUND OF THE INVENTION

It is known from the state of the art to provide base stations with smart antenna arrays which enable the output of fully steerable downlink beams. When employed for a user specific digital beamforming, a beamformer of such a smart antenna array is e.g. able to weight phase angle and/or amplitude of the transmitted signals in a way that the direction of the beam is adapted to move along with a terminal through the whole sector of coverage of the antenna array.

In order to be able to move a downlink beam according to the movement of a terminal, the base station has to determine the direction in which the terminal can be found. This can be achieved by estimating the azimuth direction of arrival of the uplink signals received by the base station from the respective terminal. For receiving uplink signals, base stations often employ a fixed beam reception system, the fixed beams being evaluated for estimating the direction of arrival of the uplink signals.

For illustration, FIG. 1 shows an example of an architecture in a base station used for the processing of signals from a single user for estimating the direction of arrival (DoA).

The part of the base station depicted in FIG. 1 comprises an uplink digital beam matrix 11 connected at its inputs to a uniform linear antenna array (ULA) with eight receiver antennas (not shown). The output of the uplink digital beam matrix 11 is connected via means for standard RAKE processing 12 to means for estimating the direction of arrival of uplink signals 13. The means for estimating the direction of arrival 13 are connected on the one hand to further components of the base station that are not shown. On the other hand, they are, connected to processing means 14 suited for spreading and weighting of signals. The processing means 14 receive as further inputs signals from means for downlink bit processing 15 and output signals to means for user-specific digital beamforming 16. The outputs of the means for user-specific digital beamforming 16 are connected to eight transmit antennas (not shown). The means for standard RAKE 12, for estimation of the DoA 13, for downlink bit processing 15 and the processing means 14 are used for digital base-band processing.

Signals entering the base station via the receive antennas are first processed in the digital beam matrix 11. The digital beam matrix 11 is an M×M matrix, where M is the number of antenna elements, i.e. M=8 in the described example. The digital beam matrix 11 generates from the received signals fixed reception beams in eight different directions. With the digital beam matrix 11 and the uniform linear antenna array (ULA), orthogonal beams (butler matrix) or an arbitrary set of non-orthogonal beams can be generated. The generated beams are input to the means for standard RAKE 12.

After a processing on the chip level by the means for standard RAKE 12, the beams are evaluated in the means for estimation of the direction of arrival 13 in order to be able to determine the best direction for transmission of downlink signals. The direction of arrival of the uplink signals can be estimated by simply measuring the power from each beam. In particular, the power in the pilot symbols in the channel estimate can be determined. The beam direction of the beam with the highest uplink power, averaged over fast fading, is considered as the direction of arrival, to which the downlink beam is to be directed. Alternatively, the direction of arrival can be estimated with any other known method for determining the direction of arrival in the beam space. The means for estimation of the direction of arrival 13 provide the processing means 14 with power control and weight information for forming the downlink beams corresponding to the determined direction of arrival.

In addition, further elements in the means for estimation of the direction of arrival 13 forward soft bits, including the data signals transmitted by the terminal, to the components not depicted in the figure.

Hard bits constituting signals that are to be transmitted from the network to the terminal are processed, e.g. encoded, by the means for downlink bit processing 15 and forwarded to the processing means 14. The processing means 14 are able to spread and weight those signals according to the information received from the means for estimation the direction of arrival 13. The thus processed signals are transmitted to the means for user-specific digital beamforming 16 which transmit the signals via the transmit antennas in a downlink beam directed to the determined direction of arrival of the uplink signals.

With this method, the estimation of the uplink direction of arrival is based on a rough resolution grid in the form of the fixed beams. That means, even though in the downlink the transmission beam can be steered continuously with arbitrary resolution, the accuracy of the downlink beamforming is limited to the uplink beam spacing. This accuracy is not adequate for downlink beam steering, if the number of beams is equal to the number of columns in the smart antenna array. Even if the direction of arrival resolution is improved as the number of reception beams is increased by increasing the number of receive antennas, the angular resolution is not adequate with 4–8 beams/antennas. In the uplink, the angular resolution is approximately 30° with 4 beams and approximately 15° with 8 beams.

FIGS. 2*a*–*d* show this angular distribution of the fixed uplink beams for different constellations. FIG. 2*a* is a diagram with the amplitude beam pattern over the azimuth angle in degrees of four orthogonal beams resulting from a 4-antenna array. FIG. 2*b* is a diagram with the corresponding amplitude beam pattern of eight orthogonal beams of a 8-antenna array. In contrast, FIG. 2*c* is a diagram with the amplitude beam pattern of four non-orthogonal beams of a 4-antenna array and FIG. 2*d* a diagram with the amplitude beam pattern of eight non-orthogonal beams of a 8-antenna array.

Alternatively to basing the estimation of the direction of arrival on the power of the fixed beams, the direction of the downlink beam can be selected by transforming the channel estimates back to the element domain. To this end, the beamformed signals are multiplied by an inverted digital beam matrix to obtain the element space signals. Then, any known direction of arrival techniques is used in the element space. However, for practical implementations this method leads to an excessive amount of computations.

SUMMARY OF THE INVENTION

It is an object of the invention to provide a base station, a base station module and a method which allow for a simple enhancement of the angular resolution in the estimation of the direction of arrival of uplink signals.

This object is reached on the one hand with a base station for a radio communications network, comprising a first phasing system (or 'network') for forming beams for fixed reception angles out of signals provided by a receive antenna array and for outputting the signals constituting said beams; a second phasing system (or 'network') for co-phasing and summing the signals provided by the first phasing system for at least two neighbouring beams, thus forming a beam for a reception angle in-between the at least two neighbouring beams, and for scaling amplitude and/or power of each resulting beam with a predetermined factor, and means for estimating the direction of arrival in the uplink from the beams provided by the first and second phasing systems.

On the other hand, the object is readied with a method for enhancing the angular resolution in the estimation of the direction of arrival of signals in the uplink in a base station of a radio communications network, comprising:

- receiving uplink signals with a receive antenna array of the base station;
- forming first beams for fixed angles of arrival out of the received signals in a first phasing system (or 'network') and outputting the signals constituting said beams;
- forming at least one composite beam in-between at least two neighbouring ones of the first beams in a second phasing system (or 'network') by co-phasing and summing the signals belonging to the neighbouring beams and by scaling amplitude and/or power of each resulting composite beam with a predetermined factor; and
- estimating the direction of arrival of the received signals based on the first beams and the composite beams.

The object is equally reached with a base station module for a base station comprising such a second phasing system.

The invention proceeds from the idea that a finer angular spectrum can be achieved by further processing the already beamformed uplink signals, which present a relatively rough angular spectrum. The finer resolution is achieved by simply applying multiplications and summings on the present fixed beams, followed by a subsequent scaling. A main advantage of the method, the base station and the base station module according to the invention is therefore the simplicity with which a finer angular resolution for the estimation of the direction of arrival of uplink signals is achieved.

The estimated direction of arrival is used in particular for forming a downlink beam to be transmitted in said direction.

A receive antenna array employed for receiving uplink signals from a terminal and for providing the received signals to the first phasing of the base station can be comprised by the base station of the invention or form a supplementary part of the base station. The same applies for a transmit antenna array.

The first phasing system (or 'network') can be suited for forming orthogonal or non-orthogonal beams as fixed reception beams. Preferably, the first phasing system is moreover suited to form four or eight of such beams, depending on the number of receive antennas from which it receives uplink signals. However, any other number of receive antennas and to be formed beams can be chosen as well.

In an advantageous embodiment of the base station and the method of the invention, co-phasing and summing of the signals of two neighbouring beams provided by the first phasing system is carried out for all neighbouring beams formed by the first phasing system. Accordingly, the total number of formed beams is twice minus one the number of the original beams formed by the first phasing system.

The power and/or the amplitude of the composite beams resulting from the co-phasing and summing should be scaled according to the power and/or amplitude of the original beams, in order to make the composite beams comparable to the first beams for determining the direction of arrival. To this end, the composite beams can be scaled in a way that equal gains are achieved for all beams. The scaling factors can also be can also be selected so that the signal-to-noise ratio (SNR) for each beam is equal in case that the same signal is arriving to each beam. Alternatively, the scaling factors can be selected so that the signal-to-interference-and-noise ratio (SINR) for each beam is equal in case that the same signal is arriving to each beam.

In case the composite beams are formed exactly in the middle of two neighbouring orthogonal beams, with four original orthogonal beams the scaling factor can be set to a value which compensates the loss 0.67 dB for all composite beams and with eight original orthogonal beams to a value which compensates the loss of 0.86 dB in order to obtain equal gains for all beams. In the case of four orthogonal beams, in order to compensate the loss of 0.67 dB, the power correction factor is 16/13.7=1.1678, while the amplitude correction factor is $\sqrt{13.7}$=1.0807.

For achieving an even finer tuning of the angular resolution with the base station/base station module and by the method according to the invention, the signals of neighbouring original beams are multiplied by different predetermined factors before co-phasing and summing. Preferably, one factor is greater than 1 and the other factor smaller than 1. This way, the composite beam or beams are not necessarily placed at an angle exactly in the middle of the two neighbouring beams but can be shifted arbitrarily to any angle between the two original beams.

In this case, the scaling factor that has to be applied on the formed composite beams depends in addition on the factors used for multiplying the amplitudes.

The proposed fine tuning can be used in particular for generating several beams at different angles in between two original neighbouring beams by multiplying them with different sets of factors. Accordingly, any desired angular resolution can be obtained for estimating the direction of arrival in the uplink.

The estimation of the direction of arrival in the uplink is preferably based on an evaluation of the power of the beams provided by the first and second phasing systems (or 'networks').

The first and second phasing systems can be analogue phasing systems, but preferably they are digital phasing systems in which a complex valued weight vector represents each beam in the digital domain. Such digital phasing systems are advantageously formed by a digital beam matrix DBM.

In a digital phasing system (or 'network'), complex weights can be stored. The complex weights are then applied to incoming signals for forming the desired beams. The complex weights of the first digital phasing system can be predetermined in any suitable manner so they are suited to form the predetermined number of beams at the predetermined angles. The complex weights of the second digital phasing system are determined in a way that the beams provided by the first phasing system are co-phased and summed in the second digital phasing system when applying the complex weights to the corresponding signals.

In the digital domain, the co-phasing of neighbouring beams can be achieved by rotating the phase angle of at least one of the vectors representing two neighbouring beams. In the case of four orthogonal original beams, the phase angle of the vector representing the first of two neighbouring beams can e.g. be rotated by 0 and the phase angle of the vector representing the second of the two neighbouring beams by $+3\pi/4$ or $-3\pi/4$, depending on which beam was selected as first and which as second beam. In the case of signals received from an antenna array with eight antennas, formed into eight orthogonal beams, the phase angle of the vector representing the first of two neighbouring beams can e.g. be rotated by 0 and the phase angle of the vector representing the second beam by $+7\pi/8$ or $-7\pi/8$.

The rotated vectors of the two neighbouring beams are then summed, thus forming a single vector. This single vector represents a single composite beam in the middle of the two original neighbouring beams.

Also the multiplication of different neighbouring beams with different factors for fine tuning can be realised by multiplying the amplitudes of the corresponding vectors with different factors before rotating and summing.

The method and the base station according to the invention can also be used for estimating the angular spreading of signals impinging at the base station. For example, after finding the DOA with largest average power the corresponding power is measured also from both adjacent beams. As described above, the increment of the direction angle from one beam to the adjacent beam can be set to be arbitrarily small. If the averaged power of the adjacent beam is above a pre-set threshold the number describing the angular spread is increased by the number corresponding to the angular increment between the two adjacent beams. The threshold can be also adaptive. For instance, the angular aperture of the entire sector is scanned and an average value for signal strength is obtained which depends on the desired signal, the interference scenario and the particular radio environment. The level of the desired signal is then compared to the averaged value describing the entire sector. If the desired signal exceeds the threshold the signal power of the next beam is then calculated. This process is repeated as long as the power level of the desired signal is above the threshold. Thus the angular spread (AS) is directly proportional to the number of beams in which the averaged power of the desired signal is above the threshold and to the angle interval between two adjacent beams:

$$AS=ND$$

where N equals the number of adjacent beams in which the desired signal power is above the threshold and D is the angle increment of neighbouring beams. For example, in case of 8 original beams and 7 mid-beams the angle increment D is approximately 7.5 degrees. If the signal power exceeds the threshold in three consecutive beams the angular spread is 22.5 degrees assuming the same angle increment D from beam to beam. It is also noted that the angle increment D may vary from beam to beam which is the preferred case in orthogonal beams. If the signal power exceeds the threshold in three consecutive beams the angular spread is 22.5 degrees.

The proposed base station, base station module and method are particularly suited for an employment with WCDMA (wideband code division multiplex access) and EDGE (enhanced data rate for GSM evolution; GSM: global standard for mobile communication).

BRIEF DESCRIPTION OF THE FIGURES

In the following, the invention is explained in more detail with reference to drawings, of which

DETAILED DESCRIPTION OF THE INVENTION

FIGS. 1 and 2*a*–*d* have already been described with reference to the background of the invention.

Figure 3:
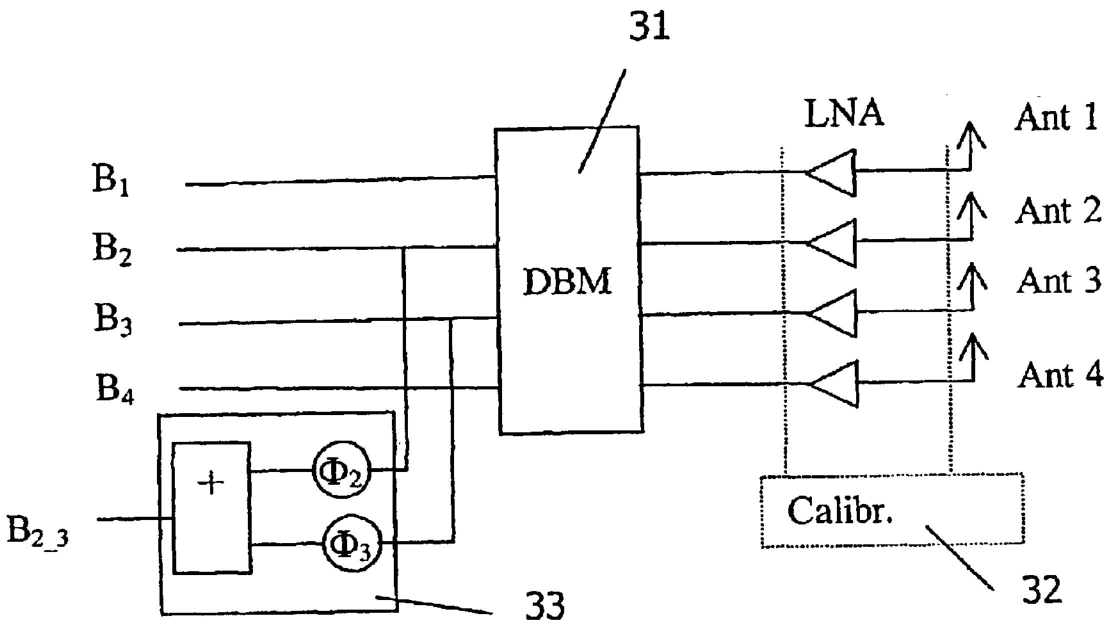
FIG. 3 shows component of a base station according to a preferred embodiment of the present invention.

FIG. 3 depicts elements of a base station according to the invention that are used in a method according to the invention.

In the base station of FIG. 3, a 4-antenna array is employed as receive antenna array. Each antenna Ant1–Ant4 is connected via a low noise amplifier LNA to a digital beam matix DBM 31, which forms a digital phasing system (or 'network') and has stored complex weights. The digital beam matrix corresponds to the uplink digital beam matrix 11 in FIG. 1*a*, except that the digital beam matrix 31 of FIG. 3 is a 4×4 instead of a 8×8 matrix. A calibration unit 32 has access to the low noise amplifiers LNA. The digital beam matrix 31 has an output line for each of four beams $B_1$ to $B_4$. The output lines for beams $B_2$ and $B_3$ are branched off and fed to a second digital phasing system (or 'network') 33. Also in the second digital phasing system 33 complex weights are stored. The second digital phasing system 33 has an output for a further beam $B_{2\text{-}3}$.

The antenna elements Ant1–Ant4 of the receive antenna array receive uplink signals from a terminal, the signals entering the antenna array from a certain direction depending on the present location of the terminal.

The signals received by the antennas Ant1–Ant4 are amplified in the low noise amplifiers LNA, the low noise amplifiers LNA being calibrated by the calibrating means 32 in a way that the transmission line from antenna elements Ant1–Ant4 to the digital beam matrix 31 can be assumed to be identical.

Figure 1:
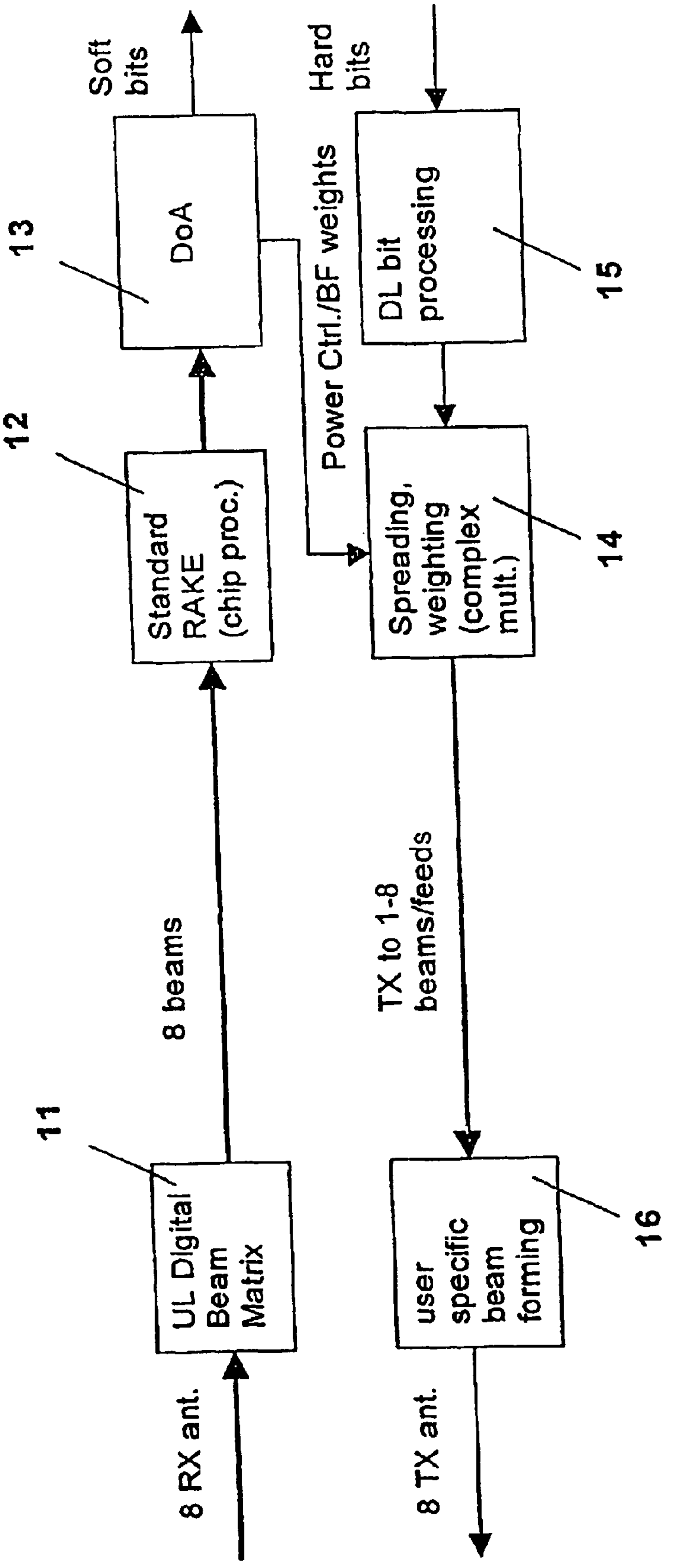
FIG. 1 PRIOR ART
FIG. 1 shows the architecture in a conventional base station for the processing of uplink signals from a single terminal.
Figure 2A:
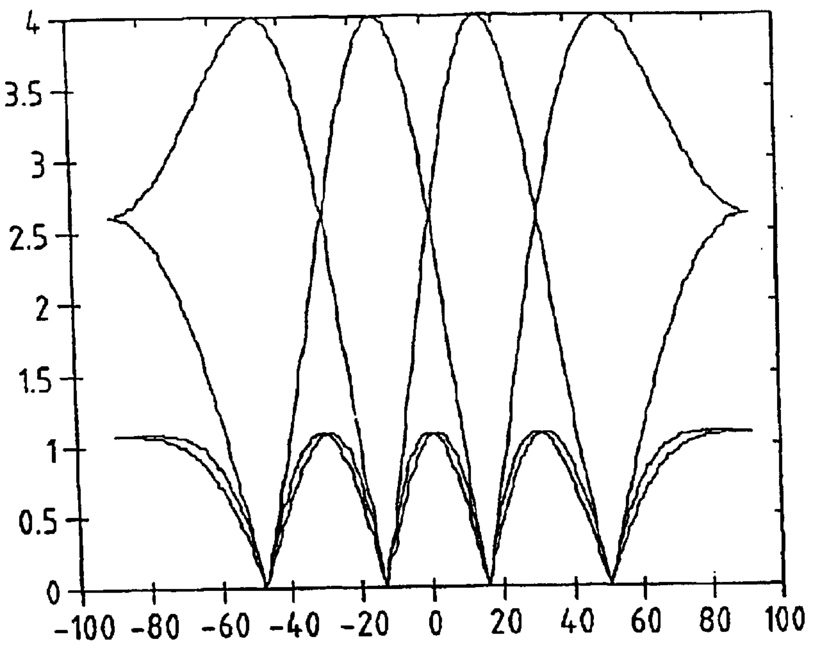
Fig.2a PRIOR ART
FIG. 2*a* shows an amplitude beam pattern of the orthogonal beams of a 4-antenna array according to the prior art.
Figure 2B:
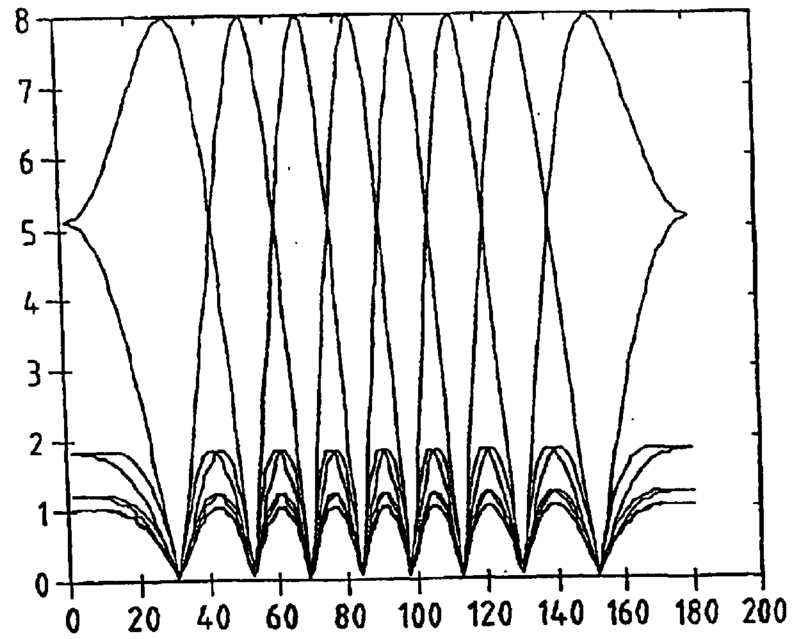
Fig.2b PRIOR ART
FIG. 2*b* shows an amplitude beam pattern of the orthogonal beams of a 8-antenna array according to the prior art.
Figure 2C:
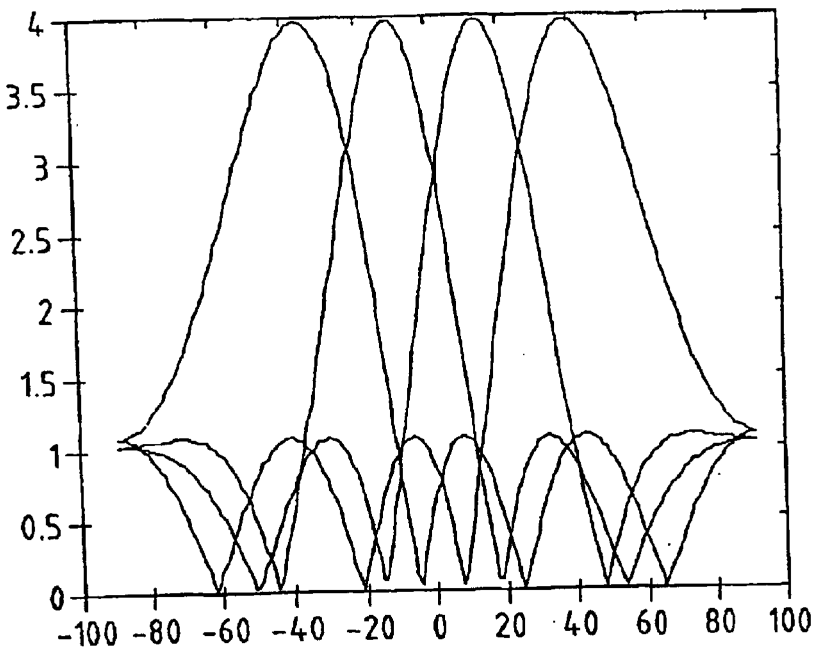
Fig.2c PRIOR ART
FIG. 2*c* shows an amplitude beam pattern of the non-orthogonal beams of a 4-antenna array according to the prior art.
Figure 2D:
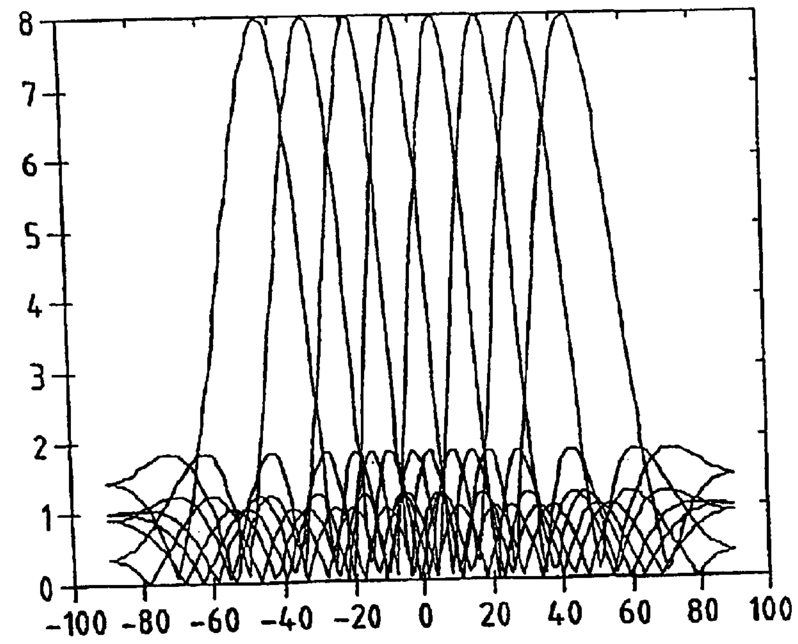
Fig.2d PRIOR ART
FIG. 2*d* shows an amplitude beam pattern of the non-orthogonal beams of an 8-antenna array according to the prior art.

In the digital beam matrix 31, four orthogonal fixed reception beams $B_1$–$B_4$ corresponding to those shown in FIG. 2*a* are formed by applying the suitably selected and stored complex weights to the received signals. The power or the amplitude of each beam indicates the strength of reception with a certain reception angle. The beams are output and fed to means for estimating the direction of arrival, as indicated e.g. in FIG. 1.

Two neighbouring beams $B_2$ and $B_3$ are fed in addition to the second digital phasing network 33. The second digital phasing network 33 performs a co-phasing and subsequent summing of the two beams $B_2$, $B_3$ by applying the further complex weights to the signals belonging to the beams $B_2$, $B_3$. These complex weights are selected such that they cause a co-phasing and summing of the received beams received from the first digital phasing network 31. The result of the application of the complex weights is therefore a response in a direction in the middle between the directions of the two original beams $B_2$, $B_3$. The amplitude and the power of this composite beam $B_{2\_3}$, however, is somewhat reduced compared to the original beams $B_2$, $B_3$, when assuming the same signal strength in all three directions. When the amount of the reduction is known, however, the composite beams can be scaled so that the relative gain of the generated beam $B_{2\_3}$, can be used in the means for estimating the direction of arrival for taking into account an additional azimuth angle.

It is now explained with reference to FIG. 4 how the scaling factor can be obtained for orthogonal beams of the 4-antenna array used in the base station of FIG. 3.

Co-phasing of two adjacent beams can be achieved by co-phasing the complex valued weight vectors representing two neighbouring beams in the digital beam matrix 31 in the digital domain. The vector $b_i$ for beam $B_i$ is obtained by summing the elements $a_k$ of the corresponding array response vector $a_i$:

$$b_i = \sum_{k=1}^{N} a_k$$

Figure 4:
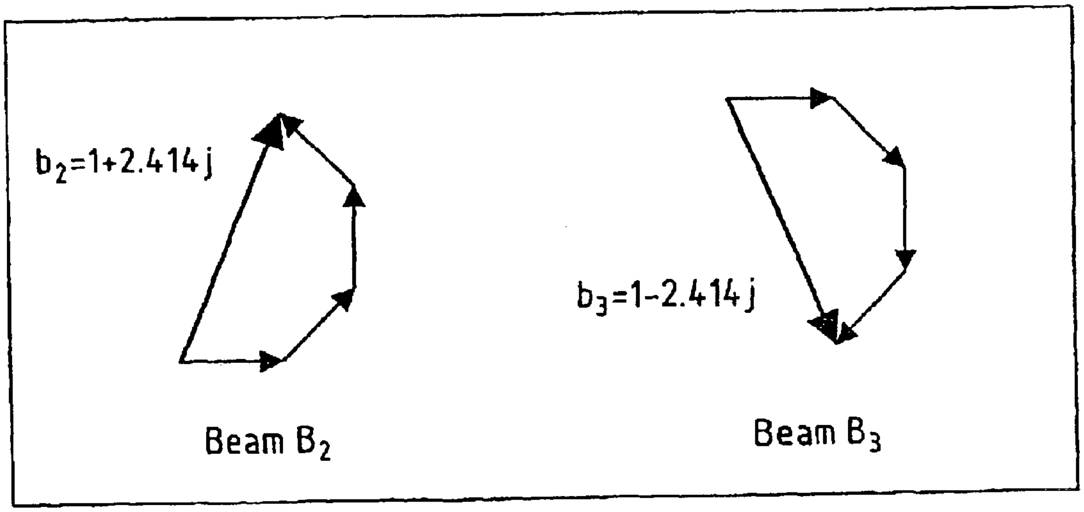
FIG. 4 illustrates the forming of complex weights in the first digital phasing network according to a preferred embodiment of the present invention.

FIG. 4 illustrates in vector form how a digital beam matrix 31 used for generating four orthogonal beams $B_1$–$B_4$ determines complex valued weight vectors for beams $B_2$ and $B_3$. Given a 4-beam digital beam matrix, the elements of the corresponding vector are added for beam $B_2$, while the phase angle is rotated from one element to the next by 45°, as shown on the left hand side of FIG. 4. The resulting vector is $b_2$=1+2,414j. Similarly, the signals from the antenna elements are added for beam $B_3$, but here the phase angle is rotated from one element to the next by −45°, as shown on the right hand side of FIG. 4. The resulting vector in this case is $b_3$=1−2,414j. Beam $B_2$ and beam $B_3$ are represented in the digital domain by these vectors $b_2$ and $b_3$.

The output of the first digital phasing network 31 can be co-phased by rotating the phase angle of beam $B_2$ or beam $B_3$ or both. Here, the phase angle of beam $B_3$ is rotated by 3π/4 to co-phase with beam $B_2$. After co-phasing, the beams are summed, leading to a composite beam $B_{2\_3}$ represented by $$b_{2\_3}=b_2+b_3=2+4.83j=5.23 \exp(j3\pi/8).$$

While the power of the four beams $B_1$ to $B_4$ output by the digital beam matrix 31 is 16, the power of the resulting beam $B_{2\_3}$ is $0.5*(5.23)^2=13.7$. Thus, the loss compared to the original beam is 13.7/16=0.67 dB. The knowledge of this loss enables a scaling of a beam generated in the middle of two fixed beams so that the relative gain of the generated beam is known and can be used for estimating the direction of arrival. The scaling factors are stored as well as the required complex weights.

For other kinds of digital beam matrices the scaling factors are determined analogously. With an 8-antenna array and a digital beam matrix forming 8 non-orthogonal beams $B_1$–$B_8$, for example, the outputs for the two centre beams, $B_4$ and $B_5$, are $b_4$=1+5.03j and $b_5$=1−5.03j. After co-phasing the two beams $B_4$, $B_5$ by rotating $B_5$ by 7π/8, the composite beam $B_{4\_5}$ is represented by $$b_{4\_5}=b_4+b_5=2+10.05j=10.25 \exp(j7\pi/16),$$

the power being 52.5 as compared to 64 for the original beams $B_1$–$B_8$. Therefore, the loss in the antenna gain in this case is 52.5/64=0.86 dB for an 8-beam digital beam matrix.

Instead of two adjacent beams, also more beams can be co-phased and summed to obtain mid-beams.

Figure 5A:
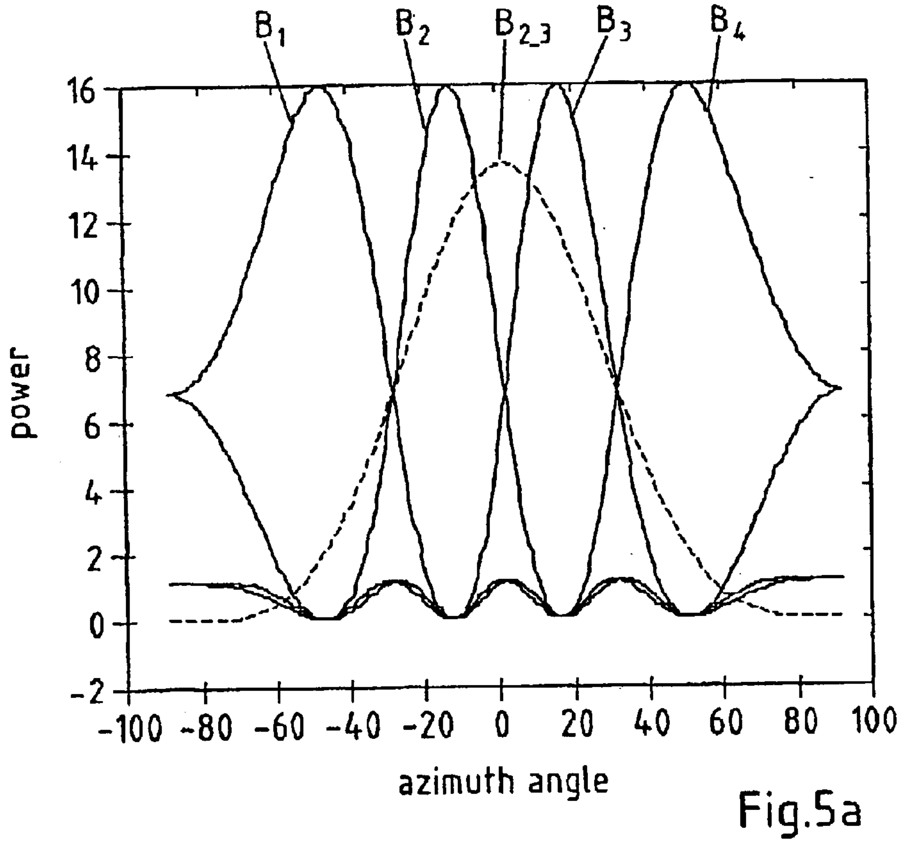
FIG. 5*a* shows a power beam pattern for a 4-antenna array with one beam generated according to a preferred embodiment of the present invention.

FIG. 5*a* is a diagram of the power beam pattern obtained by the base station of FIG. 3 without scaling in case of orthogonal Butler beams. The power is depicted over the azimuth angle from −100 to 100. As can be seen in the diagram, the power of the four original beams $B_1$ to $B_4$ is 16, while the power of the composite beam $B_{2\_3}$ is 13.7, in line with the above calculation of the scaling factors.

Figure 5B:
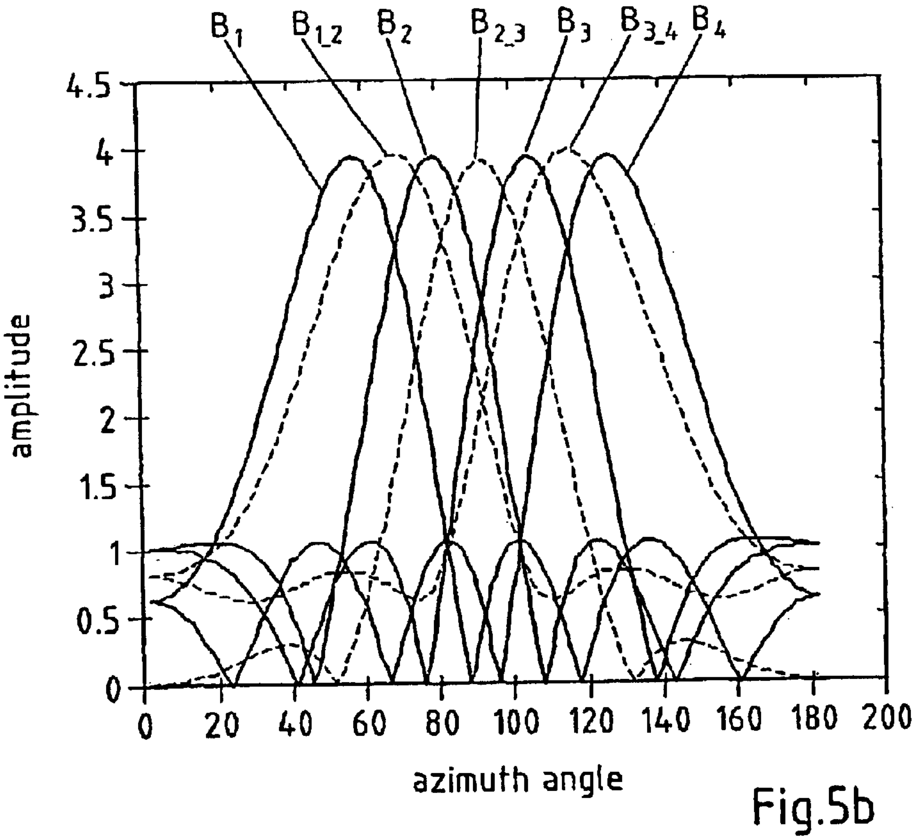
FIG. 5*b* shows an amplitude beam pattern for a 4-antenna array with three beams generated and scaled according to a preferred embodiment of the present invention.

FIG. 5*b* shows a diagram with the amplitude beam pattern of four original beams and three composite beams in case of non-orthogonal beams, where the beams are roughly scaled with corresponding scaling factors. The composite beams $B_{1\_2}$, $B_{2\_3}$, $B_{3\_4}$ have been formed between each existing pair of neighbouring original beams $B_1/B_2$, $B_2/B_3$ and $B_3/B_4$. It becomes apparent from this figure that the direction of arrival resolution can be doubled by introducing a composite beam in between all neighbouring original beams.

In another embodiment of the method according to the invention, a further increase of the angular resolution can be obtained.

The above described embodiment applies only phase shifts to the original beams, which provides one additional beam exactly between two neighbouring beams. Providing such generated composite beams is not sufficient, if there is a need for fine tuning the directions of the composite beams.

In order to be able to achieve a finer resolution, complex weights causing phase shifts and amplitude adjustments to the received beams are applied for neighbouring beams. This way, a composite beam can be directed into any desired direction.

Figure 6A:
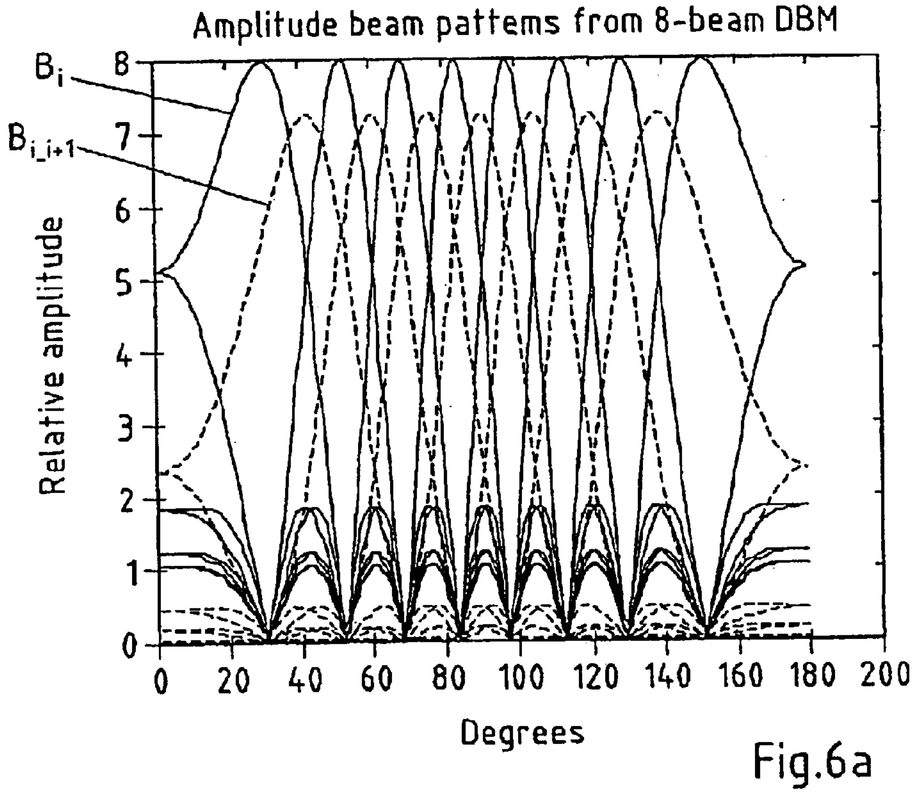
FIG. 6*a* shows an amplitude beam pattern for an 8-antenna array with seven beams generated according to a preferred embodiment of the present invention.
Figure 6B:
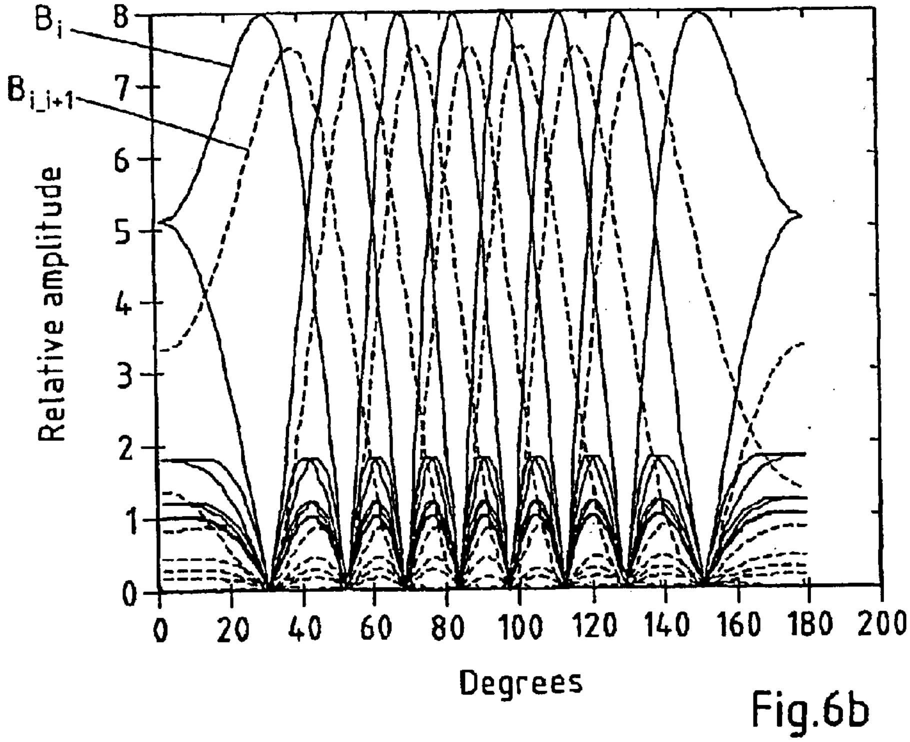
FIG. 6*b* shows an amplitude beam pattern for an 8-antenna array with seven beams generated with fine tuning according to a preferred embodiment of the present invention.

FIGS. 6*a* and 6*b* illustrate the difference between beamforming by phase shifting only and beamforming by phase shifting and an additional adjustment of the amplitudes of the original beams.

FIG. 6*a* is a diagram of the amplitude beam pattern from a 8-beam digital beam matrix forming 8 orthogonal beams $B_i$ (i=1 to 8). The additional composite beam pattern for seven composite beams $B_{i\_i+1}$ results from co-phasing and summing all neighbouring original beams $B_i$ and $B_{i+1}$ (i=1 to 7). Co-phasing was achieved by phase shifting the phase $\phi_i$ of the first one of two neighbouring beams $B_i$ by $\Delta\phi_i=0$ and the phase $\phi_{i+1}$ of the second one of two neighbouring beams $B_{i+1}$ by $\Delta\phi_{i+1}=-7\pi/8$ for all pairs of neighbouring beams. The composite beams have not been scaled, therefore they appear in the figure with a lower amplitude than the original beams.

In FIG. 6*b*, in addition to the phase shifts of $\Delta\phi_i=0$ and $\Delta\phi_{i+1}=-7\pi/8$, the amplitude of the respective first neighbouring beam $B_i$ was multiplied by 0.8 and the amplitude of the respective second neighbouring beam $B_{i+1}$ by 1.2 before summing. As a result, the generated composite beams $B_{i\_i+1}$ in FIG. 6*b* are shifted somewhat to the left as compared to the composite beams in FIG. 6*a*. By varying the factors with which the amplitudes of the original beams are multiplied, the composite beams can thus be positioned at any angle between two original beams.

This approach enables in addition that several beams can be formed between every two neighbouring original beams simply by applying different sets of factors for the multiplication of the amplitudes of the original beams, which leads to an arbitrarily fine angular resolution.

Figure 7A:
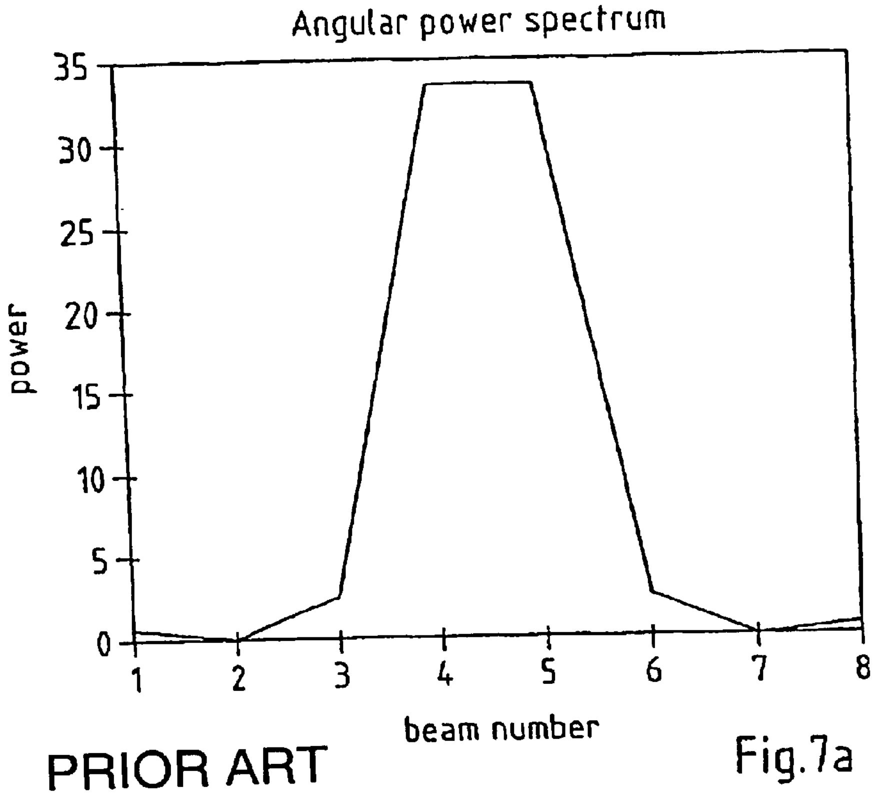
PRIOR ART Fig.7a
FIG. 7*a* shows an exemplary power distribution over 8 original beams according to the prior art.
Figure 7B:
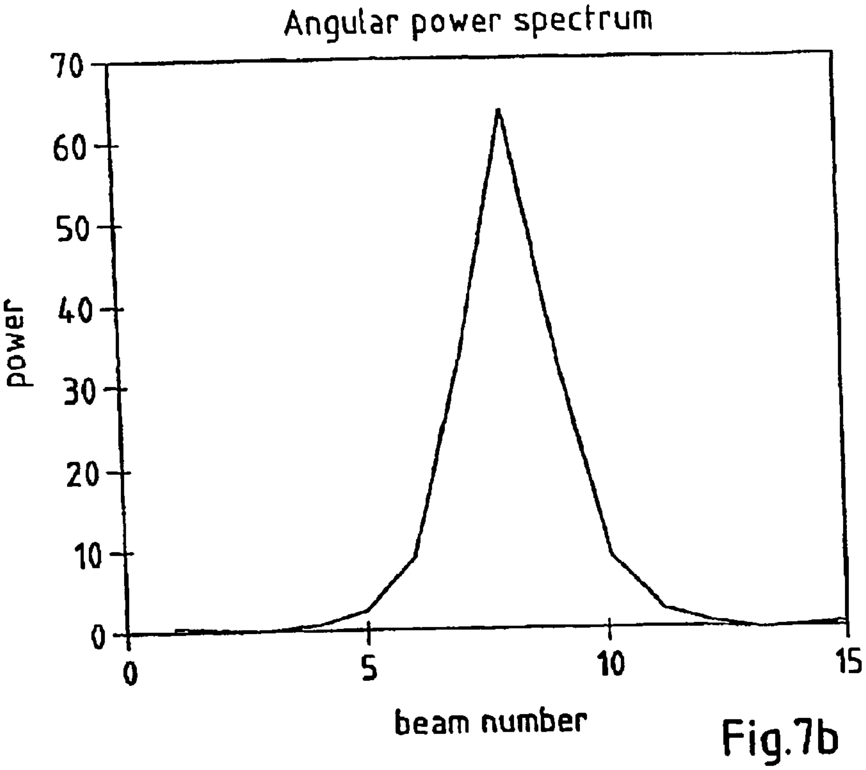
FIG. 7*b* shows an exemplary power distribution over 8 original beams and 7 composite beams generated in between the original 8 beams according to a preferred embodiment of the present invention.

Finally, FIGS. 7*a* and 7*b* show the power distribution over different non-orthogonal beams used in a base station by means for estimation of the direction of arrival of uplink signals. Both distributions correspond to the case that the signals from the terminal reach the receive antenna array of the base station perpendicularly, which is here to correspond to an azimuth angle of 0°. In FIG. 7*a*, the direction of arrival is to be estimated from the power distribution over 8 beams, all being formed by a first digital phasing network. The relation between the different beams and the different angles of arrival are the same as e.g. in FIG. 2*d*. In FIG. 7*b*, in contrast, the direction of arrival is to be estimated from the power distribution over 15 beams, including 7 composite beams formed in between the 8 original beams according to the invention. As can be seen in FIG. 7*a*, beams number 4 and number 5 have the maximum power. Accordingly, the means for estimating the direction of arrival are not able to determine the best direction for the downlink beam but only a best area which is lying between the angles of beam number 4 and beam number 5. In FIG. 7*b*, the maximum power belongs clearly to beam number 8, positioned exactly between original beams 4 (here beam 7) and original beam 5 (here beam 9) and therefore at an angle of 0°. This shows that in the latter case, the best direction for the downlink beam can be determined much more accurately.

What is claimed is:

1. A base station for a radio communications network, comprising:

a first phasing system for forming beams for fixed reception angles out of signals provided by a receive antenna array and for outputting the signals constituting said beams;

a second phasing system for co-phasing and summing the signals provided by the first phasing system for at least two neighbouring beams, thus forming a beam for a reception angle in-between the at least two neighbouring beams, and for scaling at least one of amplitude and power of each resulting beam with a predetermined factor;

means for estimating the direction of arrival in the uplink from the beams provided by the first and the second phasing systems; and means for estimating the angular spreading of the received signals based on the beams formed by the first and the second phasing system.

2. The base station of claim 1, further comprising:

the receive antenna array for receiving signals from a terminal and for providing the received signals to the first phasing system of the base station; and a transmit antenna array for transmitting a beam in the estimated direction of arrival.

3. The base station of claim 1, wherein the first phasing system is designed to form orthogonal fixed reception beams.

4. The base station of claim 1, wherein the first phasing system is designed to form non-orthogonal fixed reception beams.

5. The base station of claim 1, wherein the first phasing system is designed to form four beams out of the signals received from four receive antennas.

6. The base station of claim 1, wherein the first phasing system is designed to form eight beams out of the signals received from eight receive antennas.

7. The base station of claim 1, wherein the second phasing system is suited for scaling at least one of amplitude and power of the beams formed in between two neighbouring beams according to the at least one of amplitude and power of the beams formed by the first phasing system in a way that the gain of all formed beams is equal.

8. The base station of claim 1, wherein the second phasing system is suited for scaling at least one of amplitude and power of the beams formed in between two neighbouring beams according to the at least one of amplitude and power of the beams formed by the first phasing system in a way that the signal-to-noise ratio for each formed beam is equal when each beam from the first phasing system is equal in power and/or amplitude.

9. The base station of claim 1, wherein the second phasing system is suited for scaling at least one of amplitude and power of the beams formed in between two neighbouring beams according to the at least one of amplitude and power of the beams formed by the first phasing system in a way that the signal-to-interference-and-noise ratio for each formed beam is equal when each beam from the first phasing system is equal in power and/or amplitude.

10. The base station of claim 1, wherein the second phasing system is suited for co-phasing and summing the signals of all neighbouring beams formed by the first phasing system.

11. The base station of claim 1, wherein the second phasing system is suited for multiplying the signals provided by the first phasing system for two neighbouring beams ($B_i$, $B_{i+1}$) in between which a composite beam ($B_{i\_+1}$) is to be formed with at least one pair of different predetermined factors before co-phasing and summing in order to obtain at least one beam in-between the two neighbouring beams at at least one predetermined azimuth angle.

12. The base station of claim 1, wherein the means for estimating the direction of arrival in the uplink are suited to evaluate the power of the beams provided by the first and the second phasing system for estimating the direction of arrival.

13. The base station of claim 1, wherein the first and the second phasing systems are analogue phasing systems.

14. The base station of claim 1, wherein the first and the second phasing systems are digital phasing systems in which a complex valued weight vector represents each beam in the digital domain.

15. The base station of to claim 14, wherein, in the first and the second digital phasing systems, complex weights are stored that are to be applied to incoming signals for forming the respective beams.

16. The base station of claim 1, wherein the second phasing system is suited for co-phasing and summing at least two neighbouring beams by rotating the phase angle of at least one of the vectors representing one of the two neighbouring beams for obtaining two vectors with the same phase angle and by summing said vectors for obtaining a single vector representing a beam in between the two neighbouring beams.

17. A method for enhancing the angular resolution in the estimation of the direction of arrival of signals in the uplink in a base station of a radio communications network, comprising the steps of:

receiving uplink signals with a receive antenna array of the base station;

forming first beams for fixed angles of arrival out of the received signals in a first phasing system and outputting the signals constituting said beams;

forming at least one composite beam in-between at least two neighbouring ones of the first beams in a second phasing system by co-phasing and summing the signals belonging to the neighbouring beams and by scaling at least one of amplitude and power of each resulting composite beam with a predetermined factor;

estimating the direction of arrival of the received signals based on the first beams and the at least one composite beam; and estimating the angular spreading of the received signals based on the formed first and at least one composite beam.

18. The method of claim 17, further comprising:

forming and outputting a downlink beam in the estimated direction of arrival of the uplink signals.

19. The method of claim 17, wherein at least one of amplitude and power of the beams formed in between two neighbouring beams are scaled according to the at least one of amplitude and power of the beams formed by the first phasing system.

20. The method of claim 17, wherein the factor for scaling is set to a value leading to an equal gain for each formed beam.

21. A method for enhancing the angular resolution in the estimation of the direction of arrival of signals in the uplink in a base station of a radio communications network, comprising the steps of:

receiving uplink signals with a receive antenna array of the base station: forming first beams for fixed angles of arrival out of the received signals in a first phasing system and outputting the signals constituting said beams;

forming at least one composite beam in-between at least two neighbouring ones of the belonging to the neighbouring beams and by scaling at least one of amplitude and power of each resulting composite beam with a predetermined factor, wherein the factor for scaling is set to a value leading to an equal gain which compensates the loss of 0.67 dB for all beams formed exactly in the middle of two neighbouring first beams in case of a receive antenna array with four antennas and orthogonal first beams;

estimating the direction of arrival of the received signals based on the first beams and the at least one composite beam.

22. A method for enhancing the angular resolution in the estimation of the direction of arrival of signals in the uplink in a base station of a radio communications network, comprising the steps of:

receiving uplink signals with a receive antenna array of the base station;

forming first beams for fixed angles of arrival out of the received signals in a first phasing system and outputting the signals constituting said beams;

forming at least one composite beam in-between at least two neighbouring ones of the first beams in a second phasing system by co-phasing and summing the signals belonging to the neighbouring beams and by scaling at least one of amplitude and power of each resulting composite beam with a predetermined factor, wherein the factor for scaling is set to a value leading to an equal gain which compensates the loss of 0.86 dB for all beams formed exactly in the middle of two neighbouring beams in case of a receive antenna array with eight antennas and orthogonal first beams;

estimating the direction of arrival of the received signals based on the first beams and the at least one composite beam.

23. The method of claim 17, wherein the factor for scaling is set to a value leading to an equal signal-to-noise ratio (SNR) for each formed beam.

24. The method of claim 17, wherein the factor for scaling is set to a value leading to an equal signal-to-interference-and-noise ratio (SINR) for each formed beam.

25. The method of claim 17, wherein the second phasing system forms composite beams in between each of the neighbouring first beams formed by the first phasing system.

26. The method of claim 17, further comprising the step of:

multiplying the signals provided by the first phasing system for two neighbouring beams ($B_i$, $B_{i+1}$) in between which a composite beam ($B_{i\_i+1}$) is to be formed with a different predetermined factor before co-phasing and summing in order to obtain a beam in-between the two neighbouring beams at a predetermined azimuth angle.

27. The method of claim 17, further comprising the step of:

multiplying the signals provided by the first phasing system for two neighbouring beams with different pairs of predetermined factors in order to obtain differently weighted pairs of signals for each of the neighbouring beams, and subsequently co-phasing and summing each pair of signals in order to obtain a plurality of beams in between the two neighbouring beams at predetermined azimuth angles.

28. The method of claim 17, wherein the beams are formed by analogue first and second phasing systems.

29. The method of claim 17, wherein the beams are formed by digital first and second phasing systems in which a complex valued weight vector represents each beam in the digital domain.

30. A method for enhancing the angular resolution in the estimation of the direction of arrival of signals in the uplink in a base station of a radio communications network, comprising the steps of:

receiving uplink signals with a receive antenna array of the base station;

forming first beams for fixed angles of arrival by applying complex weights to the received signals in a first digital phasing system to thereby output a plurality of complex valued weight vectors, each representing a first beam in the digital domain;

forming at least one composite beam in-between at least two neighbouring ones of the first beams in a second digital phasing system by performing the sub-steps of:

co-phasing and summing the signals of neighbouring first beams by applying to said signals of the formed first beams complex weights causing a phase angle rotation of at least one of the vectors representing the two neighbouring beams to thereby obtain two vectors with the same phase angle and by summing said vectors; and scaling at least one of amplitude and power of each resulting composite beam with a predetermined factor; and estimating the direction of arrival of the received signals based on the first beams and the at least one composite beam.

31. The method of claim 30, wherein the co-phasing is carried out by rotating the phase angles of the vectors of two neighbouring beams by 0 and $|3\pi/4|$, respectively, in case of a receive antenna array with four antennas and orthogonal first beams.

32. The method of claim 30, wherein the co-phasing is carried out by rotating the phase angles of the vectors of two neighbouring beams by 0 and $|7\pi/8|$, respectively, in case of a receive antenna array with eight antennas and orthogonal first beams.

33. A system for improving angular resolution of a receive antenna array of a base station in a radio communications network, wherein said base station comprises a first phasing system for forming beams for fixed reception angles out of signals received from the receive antenna array and for outputting the signals constituting said beams, comprising:

a second phasing system for co-phasing and summing the signals provided by the first phasing system for at least two neighboring beams, thus forming at least one composite beam for a reception angle in-between the at least two neighbouring beams, and for scaling at least one of amplitude and power of each resulting at least one composite beam with a predetermined factor, said second phasing system comprising:

a means for multiplying the signals provided by the first phasing system for the at least two neighbouring beams ($B_i$, $B_{i+1}$) with at least one pair of different predetermined factors before co-phasing and summing the provided signals in order to form the at least one composite beam ($B_{i\_i+1}$) at a predetermined azimuth angle;

wherein the means for estimating the direction of arrival in the uplink is provided with the beams from the first phasing system and the at least one composite beam from the second phasing system.

34. A base station for a radio communications network, comprising:

a first phasing system for forming beams for fixed reception angles out of signals provided by a receive antenna array and for outputting the signals constituting said beams;

a second phasing system for co-phasing the signals provided by the first phasing system for at least two neighbouring beams by rotating the phase angle of at least one of the vectors representing one of the two neighbouring beams in order to obtain two vectors with the same phase angle, for summing said obtained vectors in order to obtain a single vector representing a beam for a reception angle in between the two neighbouring beams, and for scaling at least one of amplitude and power of each resulting beam with a predetermined factor; and means for estimating the direction of arrival in the uplink from the beams provided by the first and the second phasing systems.

35. A base station for a radio communications network, comprising:

a first phasing system for forming beams for fixed reception angles out of signals provided by a receive antenna array and for outputting the signals constituting said beams;

a second phasing system for multiplying the signals provided by the first phasing system for two neighbouring beams ($B_i$, $B_{i+1}$) in between which a composite beam ($B_{i\_i+1}$) is to be formed with at least one pair of different predetermined factors, for co-phasing and summing the multiplied signals in order to obtain at least one beam in-between the two neighbouring beams at at least one predetermined azimuth angle, and for scaling at least one of amplitude and power of each resulting beam with a predetermined factor; and means for estimating the direction of arrival in the uplink from the beams provided by the first and the second phasing systems.

36. A method for enhancing the angular resolution in the estimation of the direction of arrival of signals in the uplink in a base station of a radio communications network, comprising the steps of:

receiving uplink signals with a receive antenna array of the base station;

forming first beams for fixed angles of arrival out of the received signals in a first phasing system and outputting the signals constituting said beams;

forming at least one composite beams by performing, for each composite beam, the sub-steps of:

multiplying the signals output by the first phasing system for two neighbouring first beams ($B_i$, $B_{i+1}$) in between which a composite beam ($B_{i\_i+1}$) is to be formed with a first predetermined factor;

co-phasing and summing the multiplied signals of the two neighbouring first beams ($B_i$, $B_{i+1}$) in a second phasing system to obtain a composite beam ($B_{i\_i+1}$) at a predetermined azimuth angle in-between the two neighbouring first beams ($B_i$, $B_{i+1}$); and scaling at least one of amplitude and power of the resulting composite beam ($B_{i\_i+1}$) with a second predetermined factor; and estimating the direction of arrival of the received signals based on the first beams and the at least one composite beam.

37. A method for enhancing the angular resolution in the estimation of the direction of arrival of signals in the uplink in a base station of a radio communications network, comprising the steps of:

receiving uplink signals with a receive antenna array of the base station;

forming first beams for fixed angles of arrival out of the received signals by a first phasing system and outputting the signals constituting said beams;

forming a plurality of composite beams by performing, for each composite beam, the sub-steps of:

multiplying the signals output by the first phasing system for two neighbouring first beams with different pairs of first predetermined factors in order to obtain differently weighted pairs of signals for each of the two neighbouring first beams;

co-phasing and summing each pair of signals by a second phasing system in order to obtain a plurality of composite beams at predetermined azimuth angles in-between the at least two neighbouring first beams; and scaling at least one of amplitude and power of each resulting composite beam with a second predetermined factor; and estimating the direction of arrival of the received signals based on the first beams and the plural composite beams.

* * * * *